US011087446B2

(12) United States Patent
Ranson

(10) Patent No.: US 11,087,446 B2
(45) Date of Patent: Aug. 10, 2021

(54) AUTOMATED ARTHROPOD DETECTION SYSTEM

(71) Applicant: Matthew Henry Ranson, Carlisle, MA (US)

(72) Inventor: Matthew Henry Ranson, Carlisle, MA (US)

(*) Notice: Subject to any disclaimer, the term of this patent is extended or adjusted under 35 U.S.C. 154(b) by 119 days.

(21) Appl. No.: 16/362,322

(22) Filed: Mar. 22, 2019

(65) Prior Publication Data
US 2019/0340743 A1 Nov. 7, 2019

Related U.S. Application Data
(60) Provisional application No. 62/647,740, filed on Mar. 25, 2018.

(51) Int. Cl.
| G06T 7/00 | (2017.01) |
| G06N 20/00 | (2019.01) |
| G08B 5/36 | (2006.01) |
| H04N 5/28 | (2006.01) |
| G06K 9/62 | (2006.01) |
| G06K 9/00 | (2006.01) |

(52) U.S. Cl.
CPC ........ *G06T 7/0002* (2013.01); *G06K 9/00369* (2013.01); *G06K 9/6256* (2013.01); *G06N 20/00* (2019.01); *G08B 5/36* (2013.01); *H04N 5/28* (2013.01); *G06T 2207/20081* (2013.01)

(58) Field of Classification Search
CPC ..... H04N 5/28; A01M 1/026; G06K 9/00362; G06K 9/00369
See application file for complete search history.

(56) References Cited

U.S. PATENT DOCUMENTS

| 7,496,228 B2* | 2/2009 | Landwehr | A01M 1/026 382/165 |
| 7,765,780 B2* | 8/2010 | Koselka | A01D 46/30 56/10.2 A |
| 7,854,108 B2* | 12/2010 | Koselka | A01B 51/026 56/10.2 A |
| 7,916,951 B2* | 3/2011 | Landwehr | G06K 9/4652 382/224 |

(Continued)

*Primary Examiner* — John Villecco

(57) ABSTRACT

The invention is a system and method for searching a subject or substrate for arthropods and communicating information about any arthropods to a user. A preferred embodiment of an automated arthropod detection system includes an imaging subsystem, a processor, and a communication unit. Embodiments of an automated arthropod detection system may implemented in various configurations, which include, but are not limited to: a non-imaging configuration, a handheld configuration, a self-supporting configuration, and a wearable configuration. The method of the invention comprises using an embodiment of an automated arthropod detection system to obtain one or more digital images, process the one or more digital images using an arthropod recognition machine learning algorithm, and communicate the results from the arthropod recognition machine learning algorithm to the user of the system. The method of obtaining one or more digital images may involve accepting one or more images from a user or capturing one more images using an image sensor.

14 Claims, 9 Drawing Sheets

(56) References Cited

U.S. PATENT DOCUMENTS

| | | | | |
|---|---|---|---|---|
| 8,139,858 B1* | 3/2012 | Landwehr | ............ | A01M 3/005 |
| | | | | 382/170 |
| 8,381,501 B2* | 2/2013 | Koselka | ................ | A01D 46/30 |
| | | | | 56/10.2 A |
| 8,693,778 B1* | 4/2014 | Landwehr | ............ | A01M 3/005 |
| | | | | 382/170 |
| 8,755,571 B2* | 6/2014 | Tsai | ........................ | G06K 9/00 |
| | | | | 382/110 |
| 9,207,518 B2* | 12/2015 | Mueller | ............... | F16M 11/048 |
| 9,408,540 B2* | 8/2016 | Mueller | ................... | H04N 7/18 |
| 9,743,836 B2* | 8/2017 | Tsubouchi | ........... | A61B 5/0064 |
| 10,026,165 B1* | 7/2018 | Fryshman | ............ | A01M 3/007 |
| 10,171,734 B2* | 1/2019 | Mueller | ................ | A61B 90/39 |
| 10,255,693 B2* | 4/2019 | Smith | ................. | G06K 9/6267 |
| 10,489,670 B2* | 11/2019 | Diamond | ............ | G06K 9/3233 |
| 10,496,893 B2* | 12/2019 | Diamond | ........... | G06K 9/00671 |
| 10,542,223 B2* | 1/2020 | Bontrager | ............ | H04N 5/247 |
| 10,552,663 B2* | 2/2020 | Smith | ................. | G06K 9/3241 |
| 10,616,455 B2* | 4/2020 | Jung | .................... | H04N 5/2253 |
| 10,916,005 B2* | 2/2021 | Avrahami | ............ | G06T 7/0006 |
| 10,937,147 B2* | 3/2021 | Fryshman | ............ | G06K 9/6256 |

| | | | | |
|---|---|---|---|---|
| 2002/0169586 A1* | 11/2002 | Rankin, II | ............ | G06T 17/20 |
| | | | | 703/1 |
| 2005/0025357 A1* | 2/2005 | Landwehr | ............ | A01M 1/026 |
| | | | | 382/170 |
| 2007/0122026 A1* | 5/2007 | Ersue | ................ | G01N 21/9515 |
| | | | | 382/141 |
| 2009/0153659 A1* | 6/2009 | Landwehr | ............ | A01M 1/026 |
| | | | | 348/135 |
| 2013/0011011 A1* | 1/2013 | Fryshman | ............ | A01M 3/005 |
| | | | | 382/103 |
| 2014/0194747 A1* | 7/2014 | Kruglick | ............ | A61B 1/00172 |
| | | | | 600/473 |
| 2017/0353711 A1* | 12/2017 | Wayenberg | ........... | H04N 13/221 |
| 2018/0046872 A1* | 2/2018 | Diamond | ............... | G16H 30/40 |
| 2018/0084772 A1* | 3/2018 | Peeters | ................. | A01M 1/026 |
| 2018/0121764 A1* | 5/2018 | Zha | ..................... | G06K 9/6267 |
| 2018/0204320 A1* | 7/2018 | Fryshman | ............... | A01M 1/22 |
| 2018/0260647 A1* | 9/2018 | Diamond | ............... | G06K 9/228 |
| 2018/0322660 A1* | 11/2018 | Smith | ................... | G06K 9/6267 |
| 2019/0259472 A1* | 8/2019 | Goodreau | ............... | G16B 5/00 |
| 2019/0281213 A1* | 9/2019 | Kato | ..................... | B25J 9/1664 |
| 2019/0364197 A1* | 11/2019 | Hoexum | ................. | G03B 15/00 |
| 2020/0134351 A1* | 4/2020 | Diamond | ................ | G06K 9/00369 |
| 2020/0304719 A1* | 9/2020 | Shao | ...................... | G03B 17/56 |

* cited by examiner

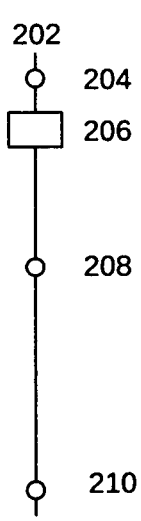
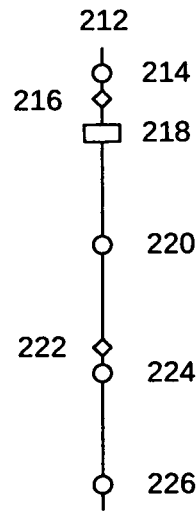
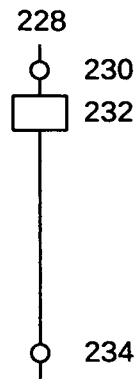
FIG. 5A  FIG. 5B  FIG. 5C
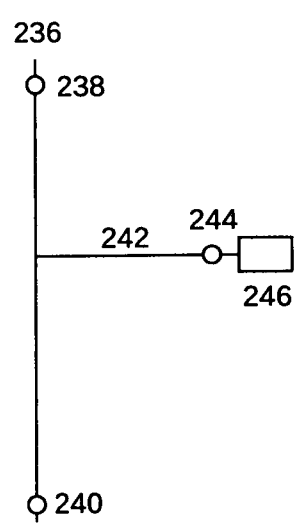
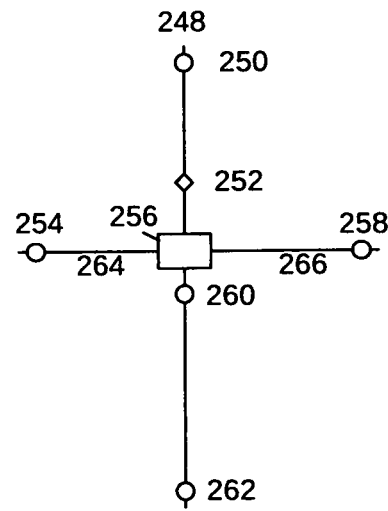
FIG. 5D  FIG. 5E

AUTOMATED ARTHROPOD DETECTION SYSTEM

CROSS REFERENCE TO RELATED APPLICATIONS

This application claims the benefits of priority to U.S. Provisional Application 62/647,740, entitled "Household arthropod detector", filed Mar. 25, 2018, the entire contents of which are hereby incorporated by reference for all purposes.

TECHNICAL FIELD

The invention relates to the field of arthropod detection, more specifically to a novel system and method for detecting arthropods and communicating relevant arthropod information to a user.

BACKGROUND

The problem that is solved by the invention is how to capture and communicate information about the presence, locations, and characteristics of any arthropods located on an subject or substrate, with high confidence and reliability.

Some attempted solutions to related problems are irrelevant or impractical, because they require specialized equipment or unrealistic user behavior. For example, an electrode grid is not a relevant device for detecting arthropods on an individual (Moore and Schellhorn, 2018). Similarly, it is unrealistic to expect a user to be willing to allow a device to spray marking material onto his or her body (Fryshman, 2014).

Other attempted solutions use ineffective arthropod detection approaches. For example, analyzing image histograms (Landwehr and Agudelo-Silva, 2009) is a statistically unreliable approach for finding arthropods in images. Similarly, the two-step procedure (Diamond, Kwart, and Tippetts, 2018) of determining whether an image contains a region of interest corresponding to an arthropod (by searching for points of contrast), and if so, providing an identification area of that image to an object detection model, is limited in effectiveness because searching for points of contrast is a unreliable statistical approach that can generate false negatives for many or even most images. For example, it will fail to find arthropods that are positioned on a material against which they have a low degree of contrast. The two-step procedure is also computationally expensive due to its two-step process.

SUMMARY OF INVENTION

The invention is a system and method for searching a subject or substrate for arthropods and communicating information about any potential arthropods to a user.

A preferred embodiment of an automated arthropod detection system includes an imaging subsystem, a processor, and a communication unit. Embodiments of an automated arthropod detection system may implemented in various configurations, which include, but are not limited to: a non-imaging configuration, a handheld configuration, a self-supporting configuration, and a wearable configuration. In the non-imaging configuration, the automated arthropod detection system includes only a processor and a communication unit. In the handheld configuration, the imaging subsystem is contained in a handheld device. In the self-supporting configuration, the system includes a support with a mounting mechanism and/or a base that supports and positions the imaging subsystem during operation. In the wearable configuration, the imaging subsystem is mounted on a wearable fastener that can be secured to a user's body, clothes, or personal possessions during operation. Additionally, in some embodiments of an automated arthropod detection system, part or all of the imaging subsystem is mounted on a powered member.

The method of the invention comprises using an embodiment of an automated arthropod detection system to obtain one or more digital images, process the one or more digital images using an arthropod recognition machine learning algorithm, and communicate the results from the arthropod recognition machine learning algorithm to the user of the system. The method of obtaining one or more digital images may take one of two modalities: accepting one or more images from a user; or capturing one more more images using an image sensor.

This summary is provided for informative purposes but should not be interpreted as limiting the scope of the invention.

Technical Problem

Ticks can carry and infect humans with a variety of serious illnesses. The United States contains habitat for a variety of tick species, including the deer tick (*Ixodes scapularis*), the dog tick (*Dermacentor variabilis*), the lone star tick (*Amblyomma americanum*), the brown dog tick (*Rhipicephalus sanguineus*), the wood tick (*Dermacentor andersoni*), and the western blacklegged tick (*Ixodes pacificus*). Many of these species are vectors for serious diseases, including Lyme disease, babesiosis, ehrlichiosis, and Rocky Mountain spotted fever. Other arthropod species, such as lice, also pose public health concerns.

One challenge in managing this health threat is that ticks are difficult to detect by human self-inspection alone. Public health organizations recommend that anyone who has been present in an outdoor environment where ticks are present should conduct a tick check (CDC, 2018). This involves a careful visual inspection of all areas of a person's body, including clothes, shoes, skin, and hair. However, there are many reasons why a person may fail to detect a tick on his or her body. For example, a tick may be located in an area where it is difficult to do a visual self-inspection, such as a shoulder or back. Additionally, juvenile ticks (known as nymphs) are very small—on the order of one to two millimeters in length—making them difficult to see. Finally, the individual doing the check may miss a tick through inattentiveness or a failure to inspect all relevant parts of the body.

The central problem that is solved by the current invention is how to capture and communicate information about the presence, locations, and characteristics of any arthropods located on an subject or substrate, with high confidence and reliability.

Solution to Problem

The current invention solves the problem described above by providing a system and method for detecting arthropods and communicating relevant arthropod information to a user.

The invention possesses many features that contribute to solving different aspects of the problem. For example, in some embodiments, the system is implemented in a self-supporting configuration in which multiple image sensors are positioned on a support at heights and orientations that are most likely to include arthropods in the fields-of-view of the image sensors. This makes it possible for a user to conduct a thorough full-body tick check, simply by standing in front of the system and turning in a circle, while the system captures images of the user and processes them using an arthropod recognition machine learning algorithm.

As another example, in some embodiments the system is implemented in a wearable modality, in which a user can use a wearable fastener to attach an image sensor to his or her body, clothing, shoes, body, or personal possessions. This modality makes it possible for the system to check the user for ticks frequently or even continuously while the user is present in an outdoor area.

Advantageous Effects of Invention

Embodiments of the current invention have numerous advantageous effects. For example, one important benefit of the invention is to provide a way for individuals who live in areas where ticks are present to conduct better tick checks, and thus avoid the risk of contracting tick-borne illnesses. The invention also provides a way for individuals who live in areas where ticks are present to search an outdoor area for ticks, for example, in order to avoid contact with any ticks that are present there.

BRIEF DESCRIPTION OF DRAWINGS

FIG. 5A is a diagram of an example layout of an embodiment of an automated arthropod detection system.

FIG. 5B is a diagram of an example layout of an embodiment of an automated arthropod detection system.

FIG. 5C is a diagram of an example layout of an embodiment of an automated arthropod detection system.

FIG. 5D is a diagram of an example layout of an embodiment of an automated arthropod detection system.

FIG. 5E is a diagram of an example layout of an embodiment of an automated arthropod detection system.

DESCRIPTION OF EMBODIMENTS

The invention is a system and method for searching a subject or substrate for arthropods and communicating information about any potential arthropods to a user. The following description of the preferred embodiments of the invention is not intended to limit the invention to these preferred embodiments, but rather to enable any person skilled in the art to make and use this invention.

The Automated Arthropod Detection System

Figure 1:
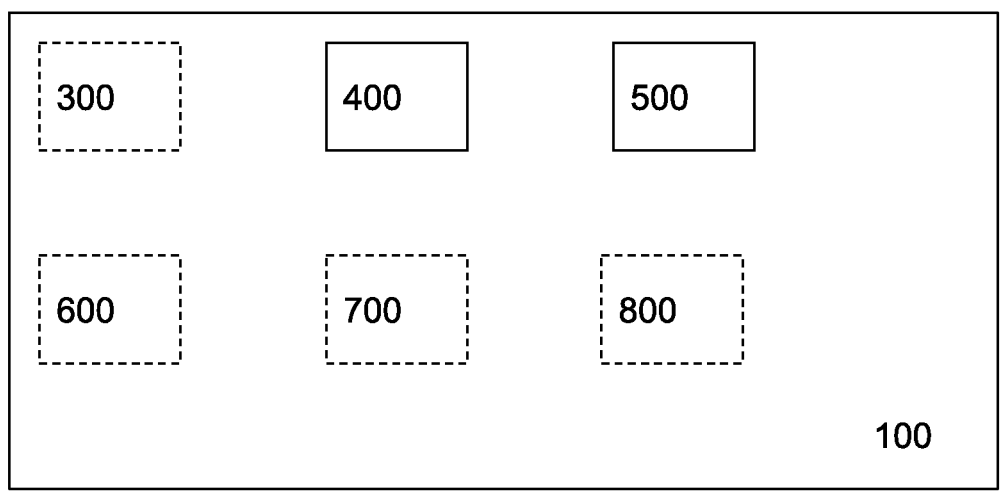
FIG. 1 is a diagram of the components of a preferred embodiment of an automated arthropod detection system.

As shown in the diagram in FIG. 1, a preferred embodiment of an automated arthropod detection system 100 includes an imaging subsystem 300, a processor 400, and a communication unit 500. In some embodiments, one or more components is mounted on a support 600. In some embodiments, part or all of the imaging subsystem is mounted on a powered member 700. In some embodiments, part or all of the imaging subsystem is mounted on a wearable fastener 800. In some embodiments, the automated arthropod detection system 100 includes only a processor 400 and a communication unit 500.

Figure 2:
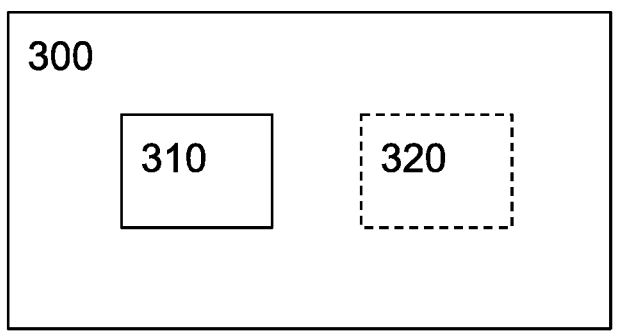
FIG. 2 is a diagram of the components of a preferred embodiment of an imaging subsystem.

As shown in the diagram in FIG. 2, a preferred embodiment of an imaging subsystem 300 contains one or more image sensors 310. Each image sensor 310 captures one or more images of all or part of one or more subjects or substrates that are positioned within the field of view of the image sensor 310. A subject is a person or animal, and a substrate is one or more surfaces of one or more objects. One example of a subject is a human user of the system, including the user's body, clothing, shoes, and other personal possessions. Another example of a subject is a person who is not the user of the system. Examples of an object include a piece of furniture, a tree, a lawn, a plant, a leaf, a house, and a car. Each image sensor 310 is capable of capturing digital images, and may be a visible light camera, infrared camera, ultraviolet camera, or other image-capturing device. In some embodiments, one or more of the image sensors 310 has a fixed focus. In some embodiments, one or more of the image sensors 310 has an adjustable focus. In some embodiments, one or more of the image sensors 310 has a zoomable, wide-angle, or fisheye lens.

Additionally, in some embodiments, the imaging subsystem 300 contains one or more light sources 320. Examples of embodiments of a light source 320 include a lightbulb, a LED, and a camera flash. The light source 320 functions to illuminate a subject or substrate while an image sensor 310 is capturing images.

The systems and methods of preferred embodiments of the invention can be embodied and/or implemented at least in part as one or more machines configured to receive a computer-readable medium storing computer-readable instructions. The instructions are preferably executed by computer-executable components preferably integrated within the system. Other components and methods of preferred embodiments can be embodied and/or implemented at least in part as a machine configured to receive a computer-readable medium storing computer-readable instructions. The instructions are preferably executed by computer-executable components preferably integrated with apparatuses and networks of the type described herein. The computer-readable medium can be stored on any suitable computer readable media such as RAMs, ROMs, optical devices (CD or DVD), flash memory, EEPROMs, hard drives, floppy drives, or any suitable device. The computer-executable component is preferably a processor 400 but any suitable dedicated hardware device can alternatively or additionally execute the instructions.

A preferred embodiment of a processor 400 is capable of executing software instructions and is electrically connected to and capable of controlling one or more other system components. The processor may be or contain a CPU, GPU, TPU, or other similar device. The processor 400 can include memory, wherein the memory can store software instructions, user commands and preferences, arthropod information (e.g., location found, size, shape, species, etc.), or any other suitable information. In some embodiments, the processor 400 has a physical connection to one or more components via electrical conductors. In some embodiments, the processor 400 is connected to one or more components using a wireless technology, such as a wireless connection, a Bluetooth connection, a Bluetooth low energy connection, or other technology. The processor 400 of an automated arthropod detection system 100 contains and is able to execute the software instructions necessary to implement the method of the invention, which in some embodiments includes obtaining one or more digital images; processing the one or more digital images using an arthropod recognition machine learning algorithm; and communicating the results from the arthropod recognition machine learning algorithm to the user of the system.

The invention includes embodiments in which the processor 400 comprises multiple processors which jointly execute the method of the invention. For example, in one embodiment, a CPU executes software instructions that control the communication unit 500, while at the same time a GPU executes software instructions that process images using an arthropod recognition machine learning algorithm.

In some embodiments, the processor 400 is capable of transmitting data to and/or receiving data from one or more processors 400 that are external to the device in which the imaging subsystem or other components are contained. One or more of these processors 400 may be, for example, a processor 400 in a computer server accessible via an internet connection, or a processor 400 on a mobile phone accessible via Bluetooth. The system and method of the invention include embodiments in which part or all of the software instructions are executed on such an external processor or processors 400. The system of the invention includes embodiments that include the networking and/or wireless technology components necessary for accessing such an external processor 400. A person of reasonable skill will recognize that the system and method of the invention include embodiments in which such an external processor 400 transmits new or updated software instructions to another processor 400 within the system, containing patches, security updates, improved machine learning algorithms, improved user interface capabilities, or changes to any other system features.

For example, in one exemplary embodiment, the automated arthropod detection system 100 comprises a mobile phone device containing a processor and display 500, and a separate server that also contains a processor. In this embodiment, the mobile phone processor and server processor jointly constitute the processor 400 of the automated arthropod detection system 100. When the user of the system submits an image to the automated arthropod detection system 100, the mobile phone processor transmits that image to the server processor over an internet connection. The server processor uses an arthropod recognition machine learning algorithm to identify arthropods in the image, and then transmits the locations of any arthropods found back to the mobile phone processor. The mobile phone display 500 then displays the image, with the locations of arthropods highlighted.

In some embodiments, the processor 400 is controlled by a user of the system via an internet, Bluetooth, or other remote connection with a separate device. In some of these embodiments, the system 100 is implemented in part as a software application running on a mobile phone, tablet, laptop computer, desktop computer, server, or other similar device. The software application functions to collection information from and to provide information to the user. The software application also functions to allow the user to control or customize the behavior of the system 100.

Figure 3:
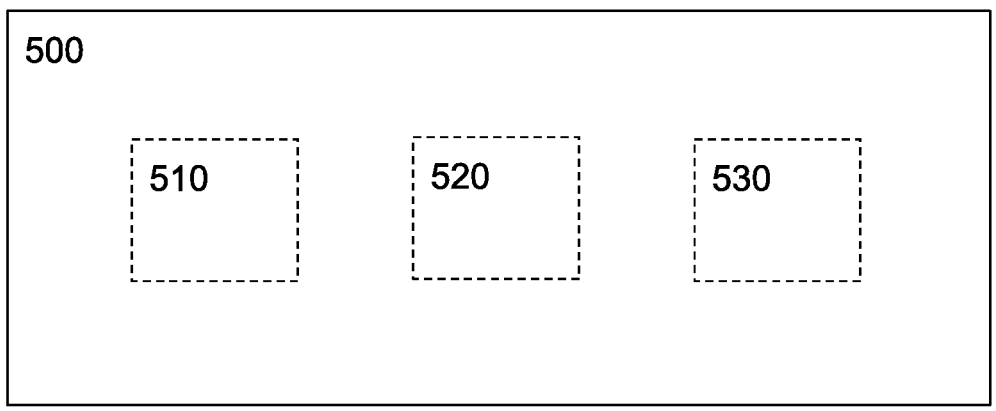
FIG. 3 is a diagram of the components of a preferred embodiment of a communication unit.

An exemplary embodiment of a communication unit 500 includes one or more components that provide a means of providing visual, audio, or tactile information to the user of the automated arthropod detection system 100, and of collecting information from the user, e.g., via instructions, prompts, results, and information. One function of a communication unit is to communicate information about arthropods found in one or more image to the user of the device. As shown in FIG. 3, a preferred embodiment of a communication unit 500 contains at least one of: a display 510, a speaker 520, or a light projector 530. The components of the communication unit 500 are controlled by the processor 400.

In embodiments in which the communication unit 500 contains a display 510, the display 510 functions to communicate visual information to the user of the system. The display may be a screen, a touchscreen, a computer monitor, a television set, an electroluminescent display, a liquid crystal display, a light-emitting diode display, a plasma display, a quantum dot display, a segment display, a cathode ray tube display, or any other type of display or screen.

In embodiments in which the communication unit 500 contains a speaker 520, the speaker 520 functions to communicate audio information to the user of the system 100. In some of these embodiments, the speaker is configured to play speech that communicates the locations of one or more arthropods detected by the system 100. In some other embodiments, the speaker is configured to play a sound such as a beep or alarm sound when an arthropod is detected by the system 100.

In some embodiments, the communication unit 500 contains one or more light projectors 530. The one or more light projectors 530 may be flashlights, lasers, LEDs, or other light-generating devices. In some embodiments, one or more of the light projectors 530 is mounted on a powered pan-tilt mechanism, powered swivel, servo, motor, action arm, or other powered member that allows the direction of the beam to be controlled by the processor 400. In some embodiments, the communication unit 500 contains many light projectors 530 that are calibrated to point towards a plurality of angles, so that the communication unit 500 can highlight a particular area on a subject or substrate by selectively activating one or more light projectors 530 that are oriented towards that particular area.

In some embodiments, the communication unit 500 contains a touchscreen, keyboard, mouse, trackball, touchpad, buttons, switches, and/or other components that will be obvious to a person of reasonable skill. In some embodiments, one or more of these components allows the user to issue a initiation command. In some embodiments, one or more of these components allows the user to provide feedback about the locations of actual arthropods, such as whether an arthropod is actually present at a location in an image.

In some embodiments, the automated arthropod detection system contains a support 600. An exemplary embodiment of a support 600 is a vertical member, horizontal member, base, frame, or other suitable component to which the imaging subsystem 300 and optionally the processor 400 and communication unit 500 are attached. A support 600 includes one or more of a mounting mechanism and/or a base, and holds one or more other components of the automated arthropod detection system 100 in a fixed position, so that an automated arthropod detection system 100 that contains a support 600 does not need to be held by a user during operation. This facilitates important non-handheld operating modalities. For example, in one modality, an automated arthropod detection system 100 contains a support 600 that holds an image sensor 310 at waist-level, allowing a user to search for arthropods on the back of his or her own body by standing with his or her back oriented toward the image sensor 310. In another modality, an automated arthropod detection system 100 contains a support 600 that holds an image sensor 310 over a patch of lawn in the user's backyard, allowing the user to search for arthropods in that patch of lawn even if he or she is inside his or her house.

In some embodiments that contain a support 600, one or more image sensors 310 are attached to the support 600 at positions where each image sensor 310 can capture one or more images of all or part of one or more sides of a subject or substrate. In some embodiments, the design and orientation of the support 600 is calibrated such that that the one more image sensors 310 mounted on the support 600 capture images that are most likely to reveal the presence of arthropods on the subject or substrate. For example, in one exemplary embodiment, a support 600 holds an image sensor 310 at knee-level and another image sensor 310 at shoulder level. In this embodiment, when a subject is positioned in front of the image sensors 310, the image sensors 310 can capture images of many areas of the subject where arthropods may be present, including clothes, outerwear, footwear, headwear, skin, body, limbs, head, hair, personal accessories, and/or personal possessions. In other embodiments, the location at which the image sensors 310 are attached to the support 600 is adjustable, for example, with a slide mechanism or clip mechanism that allows an image sensor 310 to be repositioned at different locations along the support 600. This may, for example, facilitate use of the invention by users of different heights.

In some embodiments that contain a support 600, a display 510 is attached to the support 600. In some of these embodiments, the display 510 is attached to the support 600 at a position and orientation that is convenient for a user to view. For example, in some embodiments, the display 510 is attached at a position that is approximately five feet above the floor when the support 600 is mounted on a wall. Similarly, in some embodiments that contain a display 510, the display 510 is mounted approximately two feet to the side of the imaging subsystem 300, on an extension member that is part of the support 600. This configuration facilitates a variety of use modalities. For example, using this embodiment, a user can view the display 510 while standing with any side of his or her body towards the imaging subsystem 300. Alternatively, the user can view the display 510 while a subject stands in front of the imaging subsystem 300.

In some embodiments in which the communication unit 500 contains one or more light projectors 530, the one or more light projectors 530 are attached to the support 600 at positions where they can illuminate all or part of the same field-of-view as the imaging subsystem 300.

The support 600 may take a variety of forms. In one exemplary embodiment of an automated arthropod detection system 100, shown in FIG. 4, the support 600 is a vertical member (606 and 614) constructed out of a hollow piece of molded plastic that is rectangular in cross section and approximately five feet in length. In this embodiment, there are slots at the top, middle, and bottom of the vertical member (606 and 614), each of which holds an image sensor (604, 622, and 626) that is part of the imaging subsystem 300. In this embodiment, the lens of each sensor is exposed through a hole in the vertical member (606 and 614). The positions of the image sensors (604, 622, 626) ensure that the field of view of the imaging subsystem 300 includes the majority of a standing subject's body, from various angles. In this embodiment, pre-drilled screw holes (602, 620, and 624) can be used to attach the support 600 to a vertical surface. In this embodiment, the support 600 also contains a plastic case 608 that is attached to the vertical member (606 and 614) slightly below the top image sensor. In this embodiment, this plastic case 608 holds the processor 400 and display 612. The plastic case 608 also holds a set of four buttons 610 that are each connected to the processor 400. In this embodiment, the support 600 also contains a plastic case 616 that is attached to the vertical member (606 and 614) slightly above the middle image sensor 622. This plastic case 616 holds and protects a light projector 618 with a powered pan-tilt mechanism. In this embodiment, the interior of the vertical member (606 and 614) conceals and protects the wiring and cords that connect the image sensors (604, 622, 666), processor 400, display 612, and light projector 618. The power cord 628 for the device exits at the bottom of the vertical member (606 and 614) and connects to a power adapter (not shown).

In embodiments in which the support 600 contains a mounting mechanism, the mounting mechanism provides a means to attach the device to a surface, such as a wall, furniture, pole, tree trunk, or other object. In one embodiment, the support 600 has a pre-drilled hole above each image sensor 310, so that screws can be used to attach the support 600 to a vertical surface. It is obvious to a person of reasonable skill that the mechanism for mounting the support 600 to a surface could include screws, nails, adhesive material, hooks, or any of a variety of other fasteners. In these alternative embodiments, the support 600 contains appropriate fixtures that are compatible with a particular fastener or fasteners, e.g., pre-drilled holes for screws or nails, or flat plastic surfaces to which adhesive material can be attached.

In embodiments in which the support 600 contains a base, the base can be used to position and support the invention on a horizontal surface such as a floor, a shelf, or the ground. The base contains one or more legs or platforms that can rest on a surface. In one such embodiment, the support 600 has a round weighted base. In a different embodiment, the support 600 has three legs at its bottom that form a pyramidal shape. In still other embodiments, the support 600 has two, four, five, or six legs. In some embodiments, the support 600 may be attached to a mobile platform, such as a car, truck, tractor, lawn mower, mobile robot, aerial drone, or other similar device.

In some embodiments, the support 600 comprises two or more separate pieces, each of which has its own mounting mechanism or base. For example, in one embodiment in which the imaging subsystem 300 communicates with the processor 400 via a Bluetooth connection, the imaging subsystem 300 is attached to a support 600 that includes a mounting mechanism that can be attached to a wall. In the same embodiment, the processor 400 and display 510 are attached to a separate support 600 with a flat base that can be placed on a shelf. It is obvious to a person of reasonable skill that the invention includes numerous configurations in which the support 600 may be divided into distinct pieces that are used to support different components or groups of components of the system of the invention.

In some embodiments, one or more components of the support 600 may be adjustable. For example, in one embodiment, a display 510 is contained inside a plastic case that is attached to the support 600 using a ball-and-socket joint, so that a user can swivel the display 510 up or down. It is obvious to a person of reasonable skill that in the invention, the angle, length, or position of other components may be adjustable as well.

In some embodiments, the support 600 includes or is comprised of one or more extension members and/or vertical members, which may be attached to each other. FIGS. 5A, 5B, 5C, 5D, and 5E depict diagrams of certain aspects of several embodiments of an automated arthropod detection system 100 with alternative configurations of vertical members and extension members. FIG. 5A shows an embodiment with one vertical member (202), three image sensors (204, 208, 210), and one touchscreen (206). FIG. 5B shows an embodiment with one vertical member (212), four image sensors (214, 220, 224, 226), a set of buttons (218), and one light projector (222). FIG. 5C shows an embodiment with one vertical member (228), two image sensors (230, 234), and a display (232). FIG. 5D shows an embodiment with one vertical member (236) on which there are two image sensors (238, 240), and one extension member (242) on which there is one image sensor (244) and one display (246). FIG. 5E shows an embodiment with one vertical member (248) on which there are three image sensors (250, 260, 262) and one light projector (252) and one display (256), and two extension members (264, 266) each of which contains one image sensor (254, 258). It obvious to a person of reasonable skill that the invention includes a variety of configurations of vertical members, extension members, and other components, beyond those specifically described here.

In some embodiments of an automated arthropod detection system 100, all or part of the imaging subsystem 300 is mounted on a powered member 700. An exemplary embodiment of a powered member 700 is a mechanism that allows the processor 400 to adjust the position and/or orientation of the imaging subsystem 300. An embodiment of a powered member 700 contains a motor, a servo, a robotic arm, a powered panel-tilt mechanism, an action arm, a slider, or any other mechanism that allows the processor 400 to move or rotate the powered member 700 in one, two, or three dimensions. A powered member facilitates an operation modality in which the processor 400 actively maneuvers the powered member 700 in such a way that one or more image sensors 310 captures images of a subject or substrate from different angles and positions, in order to increase the probability of detecting any arthropods that are present on the subject or substrate.

Figure 6A:
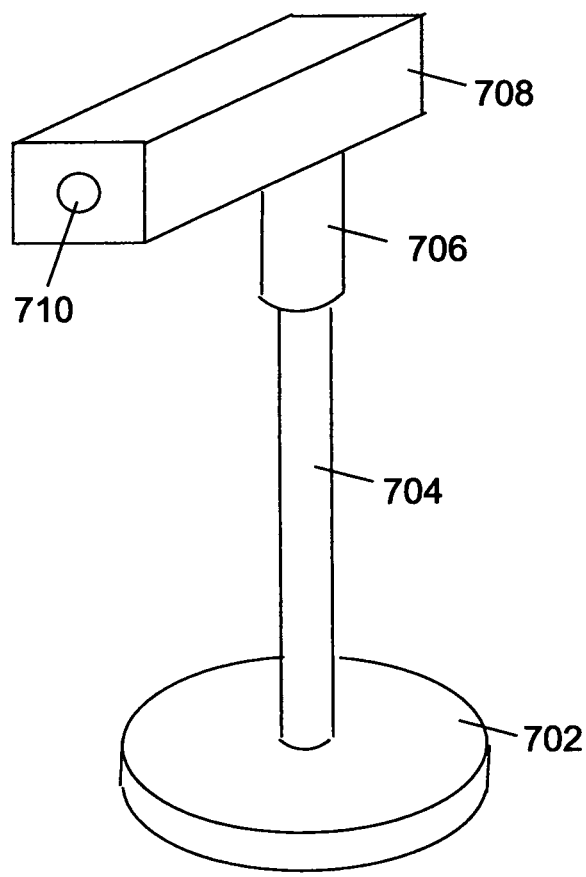
FIG. 6A is a view of the imaging subsystem, powered member, and support of an exemplary embodiment of an automated arthropod detection system.
Figure 6B:
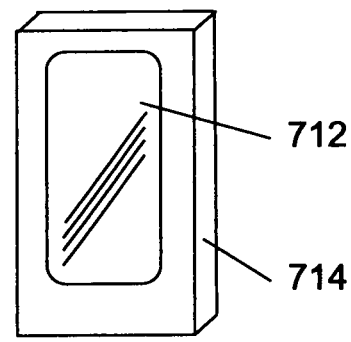
FIG. 6B is a view of an electronic device with a display that is part of an exemplary embodiment of an automated arthropod detection system.

FIGS. 6A and 6B depict views of an embodiment of an automated arthropod detection system 100 in which the imaging subsystem 300 is mounted on a powered member 700. FIG. 6A is a view of the imaging subsystem 300, powered member 700, and support 600. In this embodiment, the support 600 comprises a vertical member 704 and a base 702. The powered member 700 comprises a servo 706 that is attached between the vertical member 704 and a case 708 that houses an imaging subsystem 300 comprised of one image sensor 710. The servo 706 is capable of rotating the case 708 and image sensor 710. This embodiment of an automated arthropod detection system 100 also comprises an electronic device 714 with a display 712 and a processor 300. The electronic device 714 is depicted in FIG. 6B. The processor 300 communicates with and controls the image sensor 710 and servo 706 via a wireless connection, using components internal to the case 708 and electronic device 714.

An automated arthropod detection system 100 may also include a wearable fastener 800. An exemplary embodiment of a wearable fastener 800 is a clip, strap, or other mechanism for securing the imaging subsystem 300 to a user's body, clothes, footwear, or personal possessions. In some embodiments, the imaging subsystem 300 and wearable fastener 800 are contained in a device that is separate from the rest of the system 100. In these embodiments, the imaging subsystem 300 includes a wireless transmitter or similar device that sends and receives information, such as image data, to and from the processor 400 of the automated arthropod detection system 100.

Figure 7A:
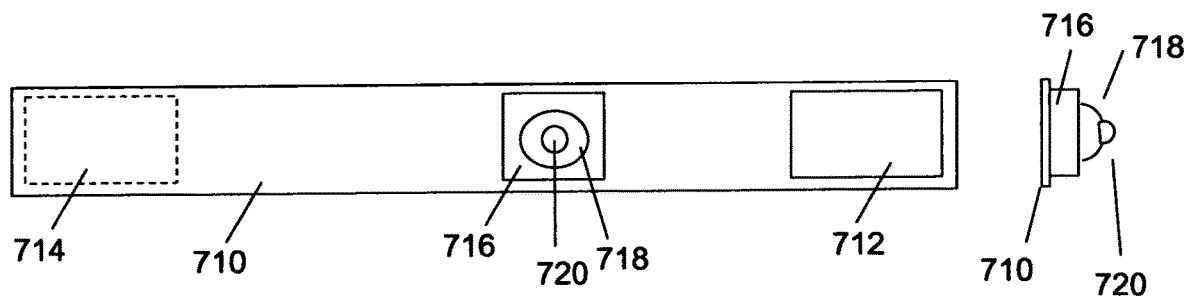
FIG. 7A is a view of the front of an exemplary embodiment of a wearable fastener and imaging subsystem.
Figure 7B:
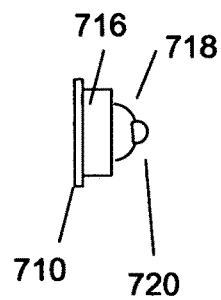
FIG. 7B is a view of the side of an exemplary embodiment of a wearable fastener and imaging subsystem.

FIGS. 7A and 7B depict views of an exemplary embodiment of a wearable fastener 800 and imaging subsystem 300. FIG. 7A is a view of the front of this exemplary embodiment. FIG. 7B is a view of the side of this exemplary embodiment. In this embodiment, the wearable fastener is a cloth band 710 with a velcro hook pad 712 at one end and a velcro loop pad 714 at the other end on the back side. A plastic housing 716 is attached midway along the cloth band 710, and an image sensor 718 with a fisheye lens 720 is secured to the plastic housing 716. A wireless transmitter and battery are inside the plastic housing 716.

An embodiment of an automated arthropod detection system 100 may implemented in various configurations. These configuration include, but are not limited to: a non-imaging configuration, a handheld configuration, a self-supporting configuration, and a wearable configuration. These configurations may be but are not necessarily mutually exclusive, and may include components other than those specifically mentioned herein.

In the non-imaging configuration, the automated arthropod detection system 100 is implemented as an electronic device, or devices, that contains a processor 400 and a communication unit 500. In some embodiments of this configuration, the processor 400 contains software instructions that enable a user to submit images to the automated arthropod detection system 100, for example, by uploading an image file. The processor 400 also contains software instructions that implement an arthropod recognition machine learning algorithm that accepts one or more images as inputs and returns information about any arthropods in the image. The communication unit 500 is configured to convey information to the user about whether arthropods are present in the one or more images, and if so, where in the one or more images the arthropods are located.

In one exemplary embodiment of an automated arthropod detection system 100 in a non-imaging configuration, the automated arthropod detection system 100 comprises a laptop computer containing a processor 400 and display 510, and a server that also contains a processor 400. When a user uploads an image file to the system using the laptop computer, the laptop processor 400 sends the image over the internet to the server processor 400, which uses an arthropod recognition machine learning algorithm to identify arthropods in the image. The server processor 400 then returns the results from the arthropod recognition machine learning algorithm to the laptop processor 400, which uses the display 510 to show a modified version of the image to user, where the locations of arthropods in the image are highlighted.

In the handheld configuration, the automated arthropod detection system 100 is implemented as a handheld device that contains an imaging subsystem 300, a processor 400, and a communication unit 500. In this configuration, the imaging subsystem 300 is contained within the handheld device, and during operation the user must hold the handheld device in a position where the imaging subsystem 300 can capture images of all or part of a subject or substrate. In some embodiments of the handheld configuration, the handheld device includes a handle. The handheld device may be implemented as a laptop computer, tablet, mobile phone, or other electronic device.

In one exemplary embodiment of an automated arthropod detection system 100 in a handheld configuration, the handheld device contains a camera, microprocessor, and screen, which are the imaging subsystem 300, a processor 400, and a communication unit 500, respectively. When the user of the system captures an image using the camera, the microprocessor uses an arthropod recognition machine learning algorithm to identify arthropods in the image. The screen then shows a modified image to user, where the locations of arthropods are highlighted.

Figure 4:
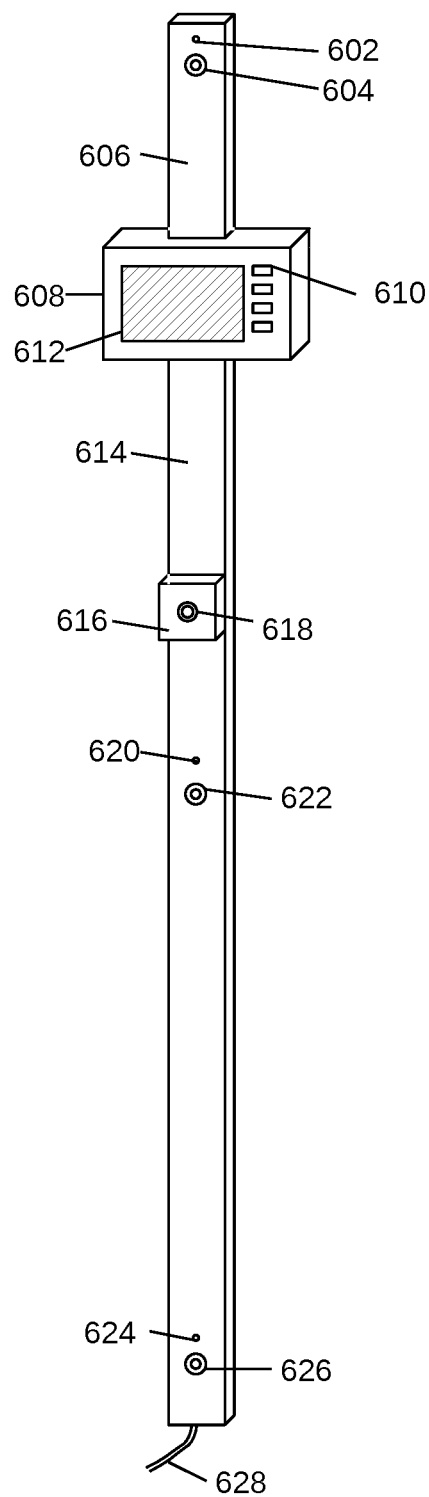
FIG. 4 is an exemplary embodiment of an automated arthropod detection system that contains a support.

In the self-supporting configuration, the automated arthropod detection system 100 is implemented as a device that contains an imaging subsystem 300, a processor 400, a communication unit 500, and a support 600. FIGS. 4 and 5 present examples of embodiments of an automated arthropod detection system 100 in self-supporting configurations.

Figure 8A:
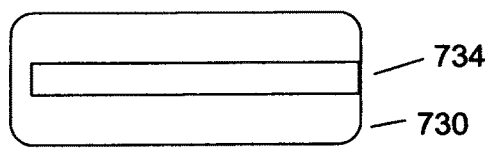
FIG. 8A is a view of the bottom of a wearable fastener that is part of an exemplary embodiment of an automated arthropod detection system in a wearable configuration.
Figure 8B:
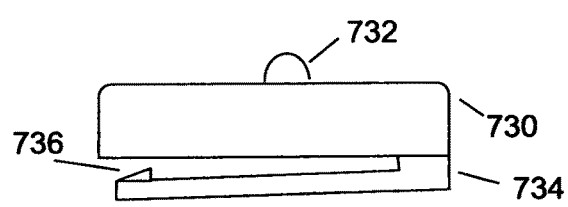
FIG. 8B is a view of the side of a wearable fastener that is part of an exemplary embodiment of an automated arthropod detection system in a wearable configuration.
Figure 8C:
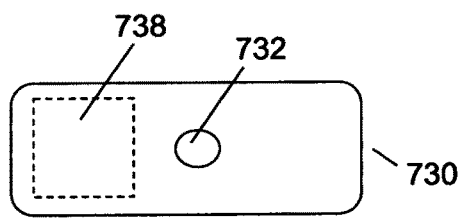
FIG. 8C is a view of the top of a wearable fastener that is part of an exemplary embodiment of an automated arthropod detection system.
Figure 8D:
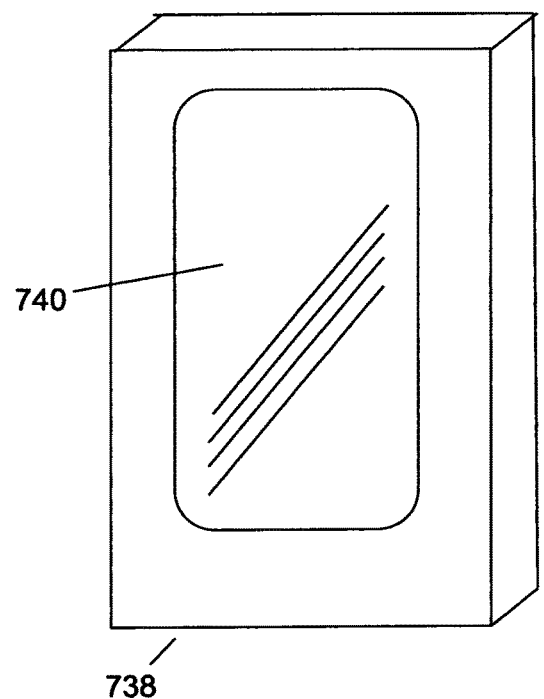
FIG. 8D is a view of an electronic device with a display that is part of an exemplary embodiment of an automated arthropod detection system in a wearable configuration.

In the wearable configuration, the automated arthropod detection system 100 is implemented as a device that contains an imaging subsystem 300, a processor 400, a communication unit 500, and a wearable fastener 700. FIGS. 8A, 8B, 8C, and 8D are views of an exemplary embodiment of an automated arthropod detection system 100 in a wearable configuration 140. FIG. 8A is view of the bottom of the wearable fastener 700 that is part of this exemplary embodiment. FIG. 8B is a view of the side of this embodiment of a wearable fastener 700. FIG. 8C is a view the top of this embodiment of a wearable fastener 700. In addition, FIG. 8D shows that in this embodiment, an electronic device 738 houses a display 740, a processor 400, a wireless module, and other components. The wearable fastener 700 comprises a plastic case 730, a clip 734, a clip hook 736, an image sensor 732, a battery case 738, a wireless module, and other components.

It is obvious to a person of reasonable skill that the automated arthropod detection system 100 includes many variations and embodiments beyond those described here. For example, in some embodiments, the automated arthropod detection system 100 contains more than one processor 400. In some of these embodiments, each processor 400 is connected to one or more image sensors 310. In some embodiments, each processor 400 controls its own communication unit 500. In other embodiments, two or more processors 400 are linked, so that one or more processors 400 acts as a hub that receives data from the others and then uses that data to control the communication unit 500.

Additionally, some embodiments of an automated arthropod detection system 100 include other components which will be obvious to a person of reasonable skill, and which may include, but are not limited to: a wireless transmitter, a bluetooth chip, touchscreen, a trackball, a touchpad, a trackpad, a keyboard, buttons, a power cord, a battery, and/or switches. For example, in some embodiments, the invention is powered by a standard AC adaptor and power cord. In some embodiments, the invention is powered by a battery, and in some of these embodiments, the battery is rechargeable and the device includes the circuitry necessary for recharging the battery.

The Automated Arthropod Detection Method

The method of the invention comprises using an embodiment of an automated arthropod detection system 100 to carry out the following:
 obtaining one or more digital images;
 processing the one or more digital images using an arthropod recognition machine learning algorithm; and
 communicating the results from the arthropod recognition machine learning algorithm to the user of the system.

Figure 9:
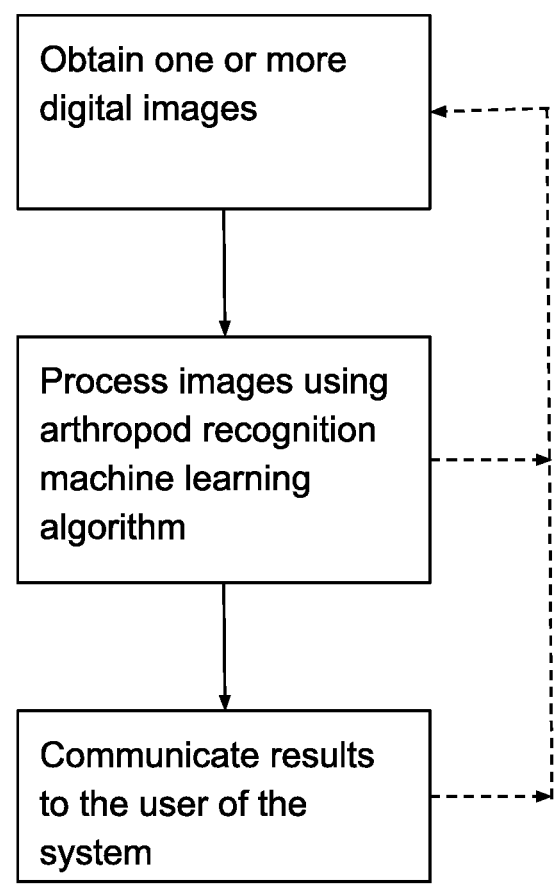
FIG. 9 is a diagram illustrating steps in the method of the invention.

FIG. 9 depicts an example of an exemplary embodiment of the method of the invention. As the figure shows, some embodiments of the method of the invention may involve repeating, one or more times, one or more of the above steps. The method of the invention can be implemented using an embodiment of an automated arthropod detection system 100 in a non-imaging configuration, a handheld configuration, a self-supporting configuration, a wearable configuration, or any other configuration. It is obvious to a person of reasonable skill that the method of the invention includes using a processor 300 to execute the software instructions necessary to control other components of the automated arthropod detection system 100.

The method of obtaining one or more digital images may take one of two modalities:
 accepting one or more images from a user; or
 capturing one more more images using an image sensor 310.

In embodiments of the invention that obtain one or more digital images by accepting one or more images from a user, the automated arthropod detection system 100 contains software instructions that allow a user to input one or digital images into the system 100. In the preferred embodiment, the software instructions implement a method that allows a user to select an image file saved on a computer or other electronic device and transfer that image to the processor 400 of the automated arthropod detection system 100.

Some embodiments of the invention obtain one or more digital images by capturing one or more images using an image sensor 310. In some of these embodiments, a single image sensor 310 captures one image or multiple images. In other embodiments, one or more image sensors 310 each capture one image or multiple images. Multiple images may be captured as distinct still photographs or as video. Capturing multiple images may provide several benefits. First, it may allow an image sensor 310 to capture images of a subject or substrate from multiple angles, thus increasing the probability that the method will detect arthropods on different parts of the subject or substrate. Second, because arthropods are small, the information contained in the pixels of a single image may in some cases be insufficient to allow a machine learning algorithm to detect an arthropod with high confidence, particularly if the arthropod is located on a distant subject or surface. However, when multiple images of the same subject or surface are captured in succession, the arthropod recognition machine learning algorithm can utilize the additional information contained in the pixels of the multiple images to make more accurate predictions.

The method of processing the one or more digital images using an arthropod recognition machine learning algorithm comprises executing software instructions that apply the arthropod recognition machine learning algorithm to the digital image. An arthropod recognition machine learning algorithm is a machine learning algorithm that accepts one or more digital images as inputs, possibly augmented by additional input information, and generates outputs that consist of one or more numeric values that represent predictions about any arthropods that are present in the image or images. The predictions for an image or images may represent information such as whether any arthropods are present in the image or images, the locations of any arthropods that are present in the image or images, the species, age, sex, and/or morphological characteristics of one or more arthropods that are present in the image or images, and/or any other information.

For example, in one exemplary embodiment, the arthropod recognition machine learning algorithm is a convolutional neural network that accepts a digital image as an input and then generates an output consisting of two numeric scores. The first score reflects the probability that an arthropod is not present in the image, and the second score reflects the probability that an arthropod is present in the image. When a score reflects a probability, it means herein that the score is a measure of the confidence of a machine learning algorithm that a variable takes a particular value, but does not imply that the score has an exact probabilistic interpretation. In this exemplary embodiment, the weight parameters of the convolutional neural network are chosen by training the neural network on a labeled set of images, where for each image, the label is a binary variable that indicates whether or not an arthropod is present in the image, and the method of training the network involves using stochastic gradient descent to find weight parameters for the convolutional neural network that minimize a cross-entropy loss function of the network outputs and the labels of the input images.

Another exemplary embodiment of an arthropod recognition machine learning algorithm is a convolutional neural network that accepts a digital image as an input and then generates an output consisting of a vector of numeric scores. In some embodiments, the first element in the vector reflects the probability that the image contains no arthropods, and the remaining elements in the vector each reflect the probability that an arthropod of a particular species is present in the image. In this embodiment, the data used to train the neural network comprises a labeled set of images, where the label for each image is a vector of binary variables in which the first element indicates whether no arthropod is present, and the remaining elements each indicate whether an arthropod of a particular species is present in the image. The method of training the network involves using stochastic gradient descent to find weight parameters for the convolutional neural network that minimize a cross-entropy loss function of the network outputs and the labels of the input images.

Another exemplary embodiment of an arthropod recognition machine learning algorithm is a convolutional neural network that accepts a digital image as an input and then outputs a matrix of pairs of numeric scores, where the first score in each pair reflects the probability that an arthropod is not present in a particular part of the image, and the second score reflects the probability that an arthropod is present in that particular part of the image. In this embodiment, the data used to train the neural network comprises a labeled set of images, where the label for each image is a matrix of binary variables, each of which indicates whether an arthropod is present in a particular part of the image. For example, the top-left element of the matrix may correspond to the top-left part of the image, and the bottom-right element of the matrix may correspond to the bottom-right part of the image.

Many other embodiments of an arthropod recognition machine learning algorithm are possible within the scope of the claimed invention. For example, in one embodiment, the arthropod recognition machine learning algorithm is a neural network that accepts a digital image as an input and then outputs one score per pixel, where the score for each pixel reflects the probability that that pixel is part of an arthropod.

The above descriptions refer to specific embodiments of a machine learning algorithm. Here, and elsewhere in the descriptions of various aspects of the system and method of the invention, the term machine learning algorithm means a machine learning algorithm or artificial intelligence technique. A machine learning algorithm or artificial intelligence technique is preferably a supervised learning method, but can alternatively be an unsupervised learning method, a semi-supervised learning method, a reinforcement learning method, an optimization technique, a convolutional neural network, a recurrent neural network, a deep learning model, or a generative-adversarial network, or can utilize any other suitable machine learning algorithm or artificial intelligence technique. The term machine learning algorithm includes methods of using the machine learning algorithm to make predictions. It also includes methods of selecting suitable parameters for the machine learning algorithm based on training data, and methods of collecting training data, which may be labeled or unlabeled.

The method of communicating the results from the arthropod recognition machine learning algorithm to the user of the system uses the communication unit 500 of the automated arthropod detection system 100. The information that is communicated to the user may include any information about the image or images or information from the arthropod recognition machine learning algorithm, such as whether any arthropods are present in the image or images, the locations of any arthropods that are present in the image or images, the species, age, sex, and/or morphological characteristics of one or more arthropods that are present in the image or images, and/or any other information.

In some embodiments of the method, information is communicated to the user in deterministic terms. For example, in some embodiments, the communication unit 500 may only indicate that an arthropod is present in the image if the arthropod recognition machine learning algorithm generates an output score that exceeds a certain threshold, such as 0.9. Alternatively, in some embodiments of the method, information is communicated to the user in probabilistic terms. The method of communication may use qualitative terms, for example, by indicating that an arthropod is "unlikely", "possibly", "likely", or "almost certainly" present. It may also use quantitative measures, for example, by indicating that there is a "87 percent chance" that an arthropod is present at a particular location in the image.

In embodiments in which the communication unit 500 includes a display 510, the display 510 may used to communicate relevant information to the user in a variety of ways. In some embodiments, the display 510 displays text or one or more images that indicate whether or not at least one arthropod is present in one or more of the images. In some embodiments, the display 510 displays all or part of one or more of the images on its screen, with markings added to each image on or near any locations where an arthropod is present. In some embodiments, the display 510 displays information about the number, species, size, gender, life stage, or other morphological characteristics of one or more of the arthropods in the image. In many exemplary embodiments, the display 510 provides an interactive interface in which the user can enter input, review output, and control and customize the behavior of the invention. In some embodiments in which one or more images are captured using a fisheye lens, the method includes transforming the one or more images and the outputs from the machine learning algorithm to correct the distortions in perspective introduced by the fisheye lens In embodiments in which the communication unit 500 includes a speaker 520, the speaker 520 may be used to communicate relevant information to the user in a variety of ways. In some embodiments, the speaker 520 may play a noise or alert when an arthropod is detected. In some embodiments, the speaker 520 may play pre-recorded or computer-generated speech to communicate results to the user.

In embodiments in which the communication unit 500 includes one or more light projectors 530, the light projectors 530 may be used to communicate relevant information to the user in a variety of ways. In one exemplary embodiment, the one or more light projectors 530 communicate relevant information about the presence of an arthropod at one or more locations by:
- selecting one or more image locations in one or more images, where the one or more image locations are image locations for which the arthropod recognition machine learning algorithm indicates that one or more arthropods is present with high confidence;
- creating a linkage in which one or more of the light projectors 530 is assigned to one or more of the image locations, where the linkage may be one-to-one or many-to-one between light projectors 530 and image locations, and where not all light projectors 530 are required to be included in the linkage;
- if necessary, adjusting the orientation of one or more of the light projectors 530 that are part of the linkage so that the beam of light projected by each light projector 530 is or will be targeted at the part of the subject or substrate that corresponds to the image location assigned to that light projector 530; and
- projecting one or more beams of light onto the subject or substrate using the one or more light projectors 530 included the linkage.

In some embodiments, the orientation of a light projector 530 that has been assigned to an image location is determined using standard trigonometric formulas, based on the assumption that the subject or substrate is located at a particular distance from the image sensor 310, combined with the known relative positions of the light projector 530 and the image sensor 310, and the known image location in the image. In other embodiments, a machine learning algorithm is used to estimate one or more or a combination of these variables. For example, in one embodiment, a neural network is used to estimate the distance of the subject or substrate from the image based on the relative position of the subject or substrate in images captured by two or more image sensors 310.

In still other embodiments, the orientation of a light projector 530 that has been assigned to an image location is determined dynamically, through a method in which (a) the light projector 530 projects a beam of light onto the subject or substrate, (b) a image sensor 310 captures one or more photos of the subject or substrate, (c) a machine learning algorithm is used to identify the location in the image that is currently highlighted by the light beam, (d) the location of the light beam in the image is compared to the location of the assigned image location, and (e) the orientation of the light projector 530 is adjusted to minimize the difference between the light beam image location and assigned image location. This method may be repeated many times, until the distance between the light beam image location and the assigned image location falls below a threshold.

In some embodiments, for each light projector 530 that is included in the linkage, the length of time that the light projector 530 projects light is set to a fixed amount of time. In other embodiments, it is varied within a preset minimum and maximum range of values based on capturing one or more additional images, using an arthropod recognition machine learning algorithm to ascertain whether an arthropod is still likely to be present at that location based on the one or more additional images, and then turning off the beam if the arthropod recognition machine learning algorithm indicates that an arthropod is not likely to be present based on the one or more additional images.

Some embodiments of the method of the invention include variations beyond those described above. For example, many embodiments include the obvious step of receiving an initiation command from a user. Receiving an initiation command may occur via a number of mechanisms, which will be obvious to a person of reasonable skill. For example, in some embodiments, a user provides an initiation command by turning on a device or by pressing a button on a device. In other embodiments, a user clicks on a menu item in a software application. In some embodiments, the image sensor array 300 uses a machine learning algorithm to detect when a subject is positioned in front of the device, which functions as the start command. Many other variations are possible.

Some embodiments of the method of the invention include variations in which the automated arthropod detection system 100 elicits feedback from a user and that feedback is used to improve the arthropod recognition machine learning algorithm. For example, in some exemplary embodiments, communicating the results from the arthropod recognition machine learning algorithm to the user of the system is followed by prompting the user to indicate whether the predictions from the arthropod recognition machine learning algorithm were correct. This feedback may take several forms. For example, in some embodiments, the user is provided with the option of pressing a button or clicking on menu item that indicates that he or she did not find an arthropod even though the communication unit 500 indicated that an arthropod was present, or conversely, that he or she did find an arthropod even though the communication unit 500 indicated that no arthropods were present. In some other embodiments, the user is prompted to click on regions of one or more images corresponding areas on the user's body where the user did find one or more arthropods. In these embodiments, the feedback from the user is used as labeled training data for improving the accuracy of the arthropod recognition machine learning algorithm.

Some embodiments of the method of the invention include variations in which the processor 400 may use the imaging subsystem 300 to capture additional images if one or more of the digital images first captured as part of the method contain certain features or result in certain output when processed by the arthropod recognition machine learning algorithm. For example, in one variation, if the arthropod recognition machine learning algorithm produces output that reflects uncertainty about whether an arthropod is present in an image, then the processor 400 may execute software instructions that cause the imaging subsystem 300 to capture one or more additional images of all or part of the same subject or substrate. In this variation, these one or more additional images are processed using the arthropod recognition machine learning algorithm, followed by communicating the results to the user of the system.

Some embodiments of the method of the invention include other variations. For example, in some embodiments of the method that use an automated arthropod detection system 100 in which an image sensor 310 is mounted on a powered member 700, the method of capturing one or more images using an image sensor 310 involves manipulating the position of the image sensor 310 using the powered member 700. A benefit of this variation is that it is capable of detecting arthropods that are located on an object that consists of a plurality of surfaces, not all of which are visible from a single fixed position. An object may be a subject or a substrate. One example of an object that consists of a plurality of surfaces is human subject, with clothing, hair, arms, legs, etc. Another example of an object that consists of a plurality of surfaces is a tree, which has multiple trunks, branches, and leaves, each of which has multiple sides arranged in a complicated three-dimensional space. Another example of an object that consists of a plurality of surfaces is a clump of grass, which has a large number of blades of grass, each of which has two sides, and which are jumbled in a three-dimensional arrangement. Other examples of objects with multiple surfaces include but are not limited to animals, humans, furniture, piles of leaves, shrubs, hedges, rocks, lawns, fences, and landscapes.

In embodiments of the method of the invention that follow this variation, the method of the invention comprises:
- capturing one or more images of the object using an image sensor 310;
- processing the one or more images of the object using a movement planning machine learning algorithm, where the output of the movement planning machine learning algorithm is a sequence of movements to be executed at a plurality of future points in time by the powered member 700, where the movements are expected to allow the image sensor 310 to capture images of a plurality of the object's surfaces;
- executing each movement in the sequence, where after or during each movement, the image sensor 310 may capture one or more additional images of one or more of the object's surfaces; and
- processing one or more of any of the digital images using an arthropod recognition machine learning algorithm; and
- communicating the results from the arthropod recognition machine learning algorithm to the user of the system.

In some embodiments, one or more of these steps are repeated one or more times, for example, so that that the sequence of planned future movements is updated after every movement based on additional images of the object. In some embodiments, a signal is generated and/or sent to a user using the communication unit 500 each time an arthropod is detected. In some embodiments, the movements of the powered member 700 bring the powered member 700 into contact with and cause it to exert force on one or more parts of the object or a nearby object. In embodiments that use this technique, the movements reposition one or more parts of the object or nearby object in order to allow the image sensor 310 to capture images of one or more parts of the object that were previously not visible. Additionally, in some embodiments, the powered member 700 used for repositioning may be distinct from the powered member 700 on which the image sensor 310 is mounted. For example, in one exemplary embodiment, one robotic arm lifts a branch of a tree while another robotic arm positions an image sensor 310 underneath the branch to capture images of the bottoms of its leaves.

A movement planning machine learning algorithm is a machine learning algorithm that accepts one or more images of an object as inputs and generates outputs that represent a sequence of one or more of movements to be executed at a plurality of future points in time by the powered member 700, where the movements are expected to allow the image sensor 310 to capture images of a plurality of the object's surfaces, for the purpose of detecting arthropods on the object. An exemplary embodiment of a movement planning machine learning algorithm is a deep reinforcement learning algorithm, in which the algorithm is implemented using a neural network, and the parameters of the neural network are trained using an objective function that rewards capturing images of as many distinct arthropods or labeled points on the object's surfaces as possible in a fixed amount of time, while also penalizing movements that bring the image sensor 310 or powered member 700 into contact with the object. In this exemplary embodiment, the network is trained using stochastic gradient descent to find a policy, which is represented by the parameters of the machine learning algorithm, that chooses movements that optimize against that objective function.

While the descriptions above contain many specifications, these should not be construed as limitations on the scope of the invention, but rather as exemplifications of one or more preferred embodiments. Many other variations and uses are possible. It is also obvious that descriptions in one part of the document may apply to other parts of the document. As a person skilled in the art will recognize from the previous detailed description and from the figures and claims, modifications and changes can be made to the preferred embodiments of the invention without departing from the scope of this invention as defined in the claims that follow below. For example, in one obvious embodiment, the invention is used to find arthropods that are located on a animal, such as a cow, horse, dog, or cat. In this embodiment, one or more of the vertical member or extension members is attached horizontally to a wall; at a height that aligns the image sensor array with the animal's body. In another obvious embodiment, the invention is used to detect the presence of species other than arthropods, which may be leeches or other parasitic or noxious animals. In another obvious embodiment, the invention is used to detect the presence of adhesive plant parts, such as burrs.

INDUSTRIAL APPLICABILITY

The invention claimed herein has industrial applicability. For example, one area of industrial applicability includes detecting arthropods on workers employed in outdoor areas where ticks are present.

REFERENCE SIGNS LIST

100: automated arthropod detection system
300: imaging subsystem
310: image sensor
320: light source
400: processor
500: communication unit
510: display
520: speaker
530: light projector
600: support 700: powered member
800: wearable fastener

CITATION LIST

Patent Literature

Diamond, Paul, Margie Fox Kwart, and Beau Tippetts. 2018. Handheld arthropod detection device. US 2018/0046872.
Fryshman, Bernard. 2017. Object image recognition and instant active response with enhanced application and utility. U.S. Pat. No. 9,852,362B2
Moore, Darren Craig, and Schellhorn, Nancy. 2018. WO 2018/068092 A1: Arthropod detection.
Val R. Landwehr, and Fernando Agudelo-Silva. 2009. Method and system for detecting and classifying objects in images, such as insects and other arthropods. U.S. Pat. No. 7,496,228B2.

Non Patent Literature

Centers for Disease Control and Prevention (CDC). 2018. Preventing Tick Bites on People. https://www.cdc.gov/lyme/prev/on_people.html

I claim:

1. An automated arthropod detection system, comprising:
   one or more image sensors mounted on a powered arm;
   a communication unit, wherein said communication unit comprises at least one from the group of a light projector, a speaker, a display, and combinations thereof; and
   a processor, wherein the processor is configured to perform operations comprising:
      generating a sequence of movements to be executed at a plurality of future points in time by the powered arm;
      executing each movement in the sequence at the plurality of future points in time using the powered arm while also capturing a first one or more digital images of a subject or substrate from one or more positions using the one or more image sensors mounted on the powered arm;
      processing the first one or more digital images using an arthropod recognition machine learning algorithm; and
      communicating the results from the arthropod recognition machine learning algorithm to a user of the system using the communication unit.

2. The automated arthropod detection system of claim 1, wherein:
   the operation of generating the sequence of movements to be executed at the plurality of future points in time by the powered arm comprises:
      capturing a second one or more digital images of the subject or substrate using the one or more image sensors mounted on the powered arm; and
      processing the second one or more digital images of the subject or substrate using a movement planning machine learning algorithm, wherein:
         said movement planning machine learning algorithm is a machine learning algorithm that accepts the second one or more digital images of the subject or substrate as inputs and produces outputs that represent the sequence of movements to be executed at the plurality of future points in time by the powered arm, the movements of which will to allow the first one or more image sensors mounted on the powered arm to capture the first one or more digital images of the subject or substrate in such a way that said first one or more digital images of the subject or substrate include a plurality of the subject or substrate's surfaces.

3. The automated arthropod detection system of claim 2, further comprising a support, wherein the powered arm is mounted on the support.

4. The automated arthropod detection system of claim 2, wherein:
   the communication unit comprises the light projector.

5. A method of arthropod detection using an automated arthropod detection system, the method comprising:
   generating a sequence of movements to be executed at a plurality of future points in time by a powered arm;
   executing each movement in the sequence at the plurality of future points in time while also capturing a first one or more digital images of a subject or substrate from one or more positions using one or more image sensors mounted on the powered arm;
   processing the first one or more digital images of the subject or substrate using an arthropod recognition machine learning algorithm; and
   communicating the results from the arthropod recognition machine learning algorithm to a user of the system using a communication unit comprising at least one from the group of a light projector, a speaker, a display, and combinations thereof.

6. The method of claim 5, wherein the step of generating the sequence of movements to be executed at the plurality of future points in time by the powered arm comprises:
   capturing a second one or more digital images of the subject or substrate using the one or more image sensors mounted on the powered arm; and
   processing the second one or more digital images of the subject or substrate using a movement planning machine learning algorithm,
   and wherein:
      said movement planning machine learning algorithm is a machine learning algorithm that accepts the second one or more digital images of the subject or substrate as inputs and produces outputs that represent the sequence of movements to be executed at the plurality of future points in time by the powered arm, wherein said sequence of movements will allow the one or more image sensor sensors mounted on the powered arm to capture the first one or more digital images of the subject or substrate in such a way that said first one or more digital images of the subject or substrate include a plurality of the subject or substrate's surfaces;
      the movement planning machine learning algorithm is one of: a supervised learning method, an unsupervised learning method, a semi-supervised learning method, a reinforcement learning method, an optimization technique, a convolutional neural network, a recurrent neural network, a deep learning model, or a generative-adversarial network; and
      the parameters of the movement planning machine learning algorithm are chosen by training on one or more of first labeled or first unlabeled data.

7. The method of claim 6, wherein:
   the arthropod recognition machine learning algorithm is a machine learning algorithm that accepts the first one or more digital images of the subject or substrate as inputs and generates outputs that consist of one or more numeric values that represent predictions about any arthropods that are present in the first one or more digital images of the subject or substrate;

said arthropod recognition machine learning algorithm is one of: a supervised learning method, an unsupervised learning method, a semi-supervised learning method, a reinforcement learning method, an optimization technique, a convolutional neural network, a recurrent neural network, a deep learning model, or a generative-adversarial network; and the parameters of the arthropod recognition machine learning algorithm are chosen by training on one or more of second labeled or second unlabeled data.

8. The method of claim 7, wherein predictions about any arthropods that are present in the first one or more digital images of the subject or substrate include one or more of: whether any arthropods are present in the first one or more digital images of the subject or substrate, the locations of any arthropods that are present in the first one or more digital images of the subject or substrate, or the species, age, sex, and/or morphological characteristics of one or more arthropods that are present in the first one or more digital images of the subject or substrate.

9. The method of claim 6, wherein:

the communication unit comprises the speaker; and the step of communicating the results from the arthropod recognition machine learning algorithm to the user of the system additionally comprises using the speaker to play sounds when an arthropod is detected.

10. The method of claim 6, wherein the step of communicating the results from the arthropod recognition machine learning algorithm to the user of the system additionally comprises projecting one or more light beams from the light projector onto one or more regions of the subject or substrate where an arthropod has been detected.

11. The method of claim 6, additionally comprising:

eliciting feedback data from the user of the system after communicating the results from the arthropod recognition machine learning algorithm; and using that feedback data to improve the arthropod recognition machine learning algorithm.

12. The method of claim 6, additionally comprising:

repeating one or more of the steps of the method one or more times.

13. The method of claim 6, wherein:

the sequence of movements represented by the output of the movement planning machine learning algorithm will additionally cause the powered arm to exert force on and reposition one or more parts of the subject or substrate, or one or more parts of an object that is near the subject or substrate;

said sequence of movements will additionally allow the one or more image sensors mounted on the powered arm to capture the first one or more digital images of the subject or substrate in such a way that said first one or more digital images of the subject or substrate include surfaces of the subject or substrate that were not previously visible; and said powered arm comprises a first powered arm and a second powered arm, wherein:

the first powered arm is used to capture the first one or more digital images of the subject or substrate, and the second powered arm is used to exert force on and reposition one or more parts of the subject or substrate, or one or more parts of an object that is near the subject or substrate.

14. The method of claim 5, wherein the arthropod recognition machine learning algorithm is a convolutional neural network that accepts the first one or more digital images of the subject or substrate as an input and generates numeric outputs that indicate whether one or more ticks is present in the first one or more digital images of the subject or substrate.

* * * * *